Nov. 6, 1956 G. DROUHOT 2,769,342
ESCAPEMENT MECHANISM
Filed July 6, 1955
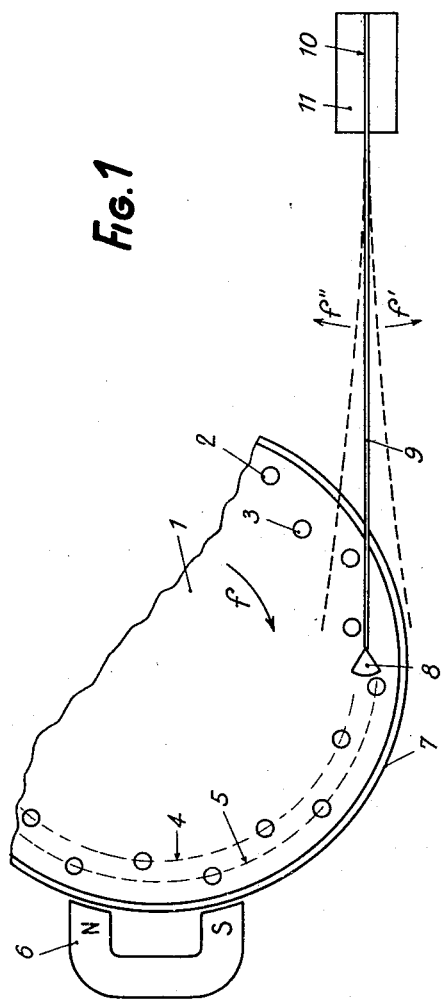
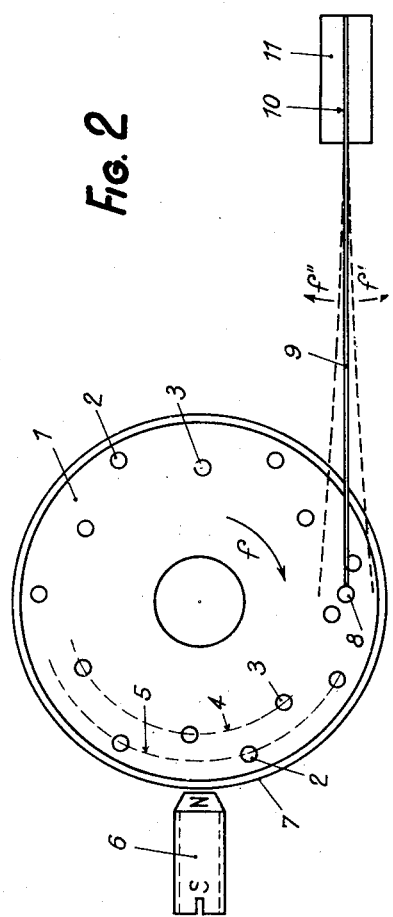
INVENTOR:
GERMAINE DROUHOT

United States Patent Office 2,769,342
Patented Nov. 6, 1956

2,769,342

ESCAPEMENT MECHANISM

Germaine Drouhot, La Fare-les-Oliviers, France, assignor to Lip S. A. d'Horlogerie, Besançon (Doubs), France, a French body corporate Application July 6, 1955, Serial No. 520,341

1 Claim. (Cl. 74—1.5)

The present invention relates essentially to a novel method of and a device for adjusting and regulating in permanent fashion a member rotating continuously and forming part, for example, of a clockwork or like precision mechanism.

In precision mechanisms comprising a member rotating continuously it is a well-known requirement that on the one hand the rotational movement should take place with a particularly accurate regularity and that on the other hand this rotational movement must be protected efficiently against external influences such as shocks, jolts, etc. Many devices have already been proposed with a view to avoid these inconveniences and bring a satisfactory solution to the problems arising in this connection. Yet so far as the applicant is aware, of these known devices, none provides a simple solution to this problem of isolating the mechanism from external influences.

Now it is the purpose of the method of this invention to avoid the inconveniences characterizing hitherto existing means and this method is remarkable notably in that it consists in combining the action of a permanent brake or retarding member acting on the rotating member and preventing any untimely rotation thereof with the action of an oscillating element having a stable oscillation frequency, the oscillation of this element defining with a very high accuracy the travel effected by this rotating member within a predetermined and arbitrary time unit.

It will be readily understood that the combination of a member oscillating under stable frequency conditions with a retarding member acting on the rotating member, such as a plate or a disc, will prevent the latter from moving at any undue rates which the oscillating member would be unable to reduce or restore to the original or desired value. Therefore, a coherent combination of two members is obtained and the combined action of these members when associated with a precision mechanism will avoid any undue or untimely acceleration of the rotating member which would cause this member to be substracted from the synchronizing action of the oscillating member.

The present invention is also concerned with a device constituting a practical application of the method broadly disclosed hereinabove, this device being remarkable notably in that it comprises in combination a permanent retarding or braking member acting on the rotating member and adapted to prevent it from rotating at a rate higher than a predetermined velocity, and a stable-frequency oscillating member also acting on the rotating member and imparting thereto a velocity of rotation characterized by a high degree of precision.

Of course, the retarding member acting on the rotating member of the mechanism may consist of a friction brake, a magnetic brake, etc., and on the other hand the oscillating member may be a vibratory rod or reed co-acting with pins or studs disposed for example stepwise or in alternate circular rows on the rotary member. However, it will be readily understood that any other devices may be utilized for carrying out the method of the present invention, without departing from the spirit and scope thereof. Other features and advantages of the invention will appear as the following description made with reference to the accompanying drawing wherein:

Figure 1 is a diagrammatical view showing a first form of embodiment of a mechanism according to the invention, and Figure 2 is a similar view of an alternate embodiment.

In the example illustrated in Fig. 1 it is assumed that the device to which the invention is applied consists of a clockwork or like precision mechanism comprising a rotating member 1 in the form of a plate or disc to which a predetermined velocity of rotation is impressed in the direction of the arrow *f*. It is also assumed that this rotational movement takes place continuously. In the vicinity of the periphery of the member or disc 1 there are provided two circular rows of pins or studs 2, 3 placed on two concentrical circles 4, 5 as shown. Thus, these pins are disposed stepwise or in alternate circular rows along the periphery of the plate or disc 1.

A retarding member 6 adapted to act on the disc 1 is also provided. In the example illustrated it consists of a so-called regulating magnet acting either on the peripheral edge of the disc 1 as shown in Fig. 1 or on the plane of this disc when the latter is positioned in the magnetic gap of the magnet. Of course, any other arrangements may be employed in this respect without departing from the spirit and scope of the invention. Similarly, a friction brake of any suitable type may also be employed for this purpose.

In the example illustrated the disc 1 may be made of plastic material, for example the product known under the trade name of Plexiglas or any other suitable substance covered by a sheath of permeable metal. This sheath is designated by the reference number 7 in Fig. 1.

The pins or studs 2, 3 cooperate according to the known principle with the end portion 8 of an oscillating rod 9 the other end 10 of which is inserted in a fixed block 11, for example. The end 8 of this rod may carry a so-called connecting member, such as ruby or like material, adapted to co-act with the pins or studs 2, 3 of the disc 1.

From the foregoing it will be readily apparent that the rod vibration taking place in the direction of the arrows *f'* and *f"* are produced by the shocks applied by the pins 2, 3 on the ruby 8, and since the rod has a stable frequency of oscillation it will exert in turn a synchronizing action on the well-defined and predetermined movement of rotation limited by the brake 6 acting on the disc 1. Thus, at no time will the disc 1 be able to rotate at an improper speed likely to synchronize the action of the oscillating rod 9 with a multiple of the pins or studs of the disc 1 instead of with each of them. This synchronizing with a multiple would release the assembly at a faster rate than desired, so that a loss of precision will be observed in the operation.

The example illustrated in Fig. 2 differs from the embodiment described hereinabove only in that the retarding means 6 is disposed in a slightly different position and, before all, in the way the pins 2 and 3 act on the rod 9. In fact, in the example of Fig. 1 it is assumed that a purely mechanical action takes place between the elements 2, 3 on the one hand and 8, on the other hand; now in the case of Fig. 2 it is assumed that the pins or studs 2, 3 may be of permeable metal and that the ruby 8 may be replaced by a magnet. Under these conditions, the rod 9 is vibrated by the successive attractions and repulsions exerted between the pins 2, 3 on the one hand and the magnet 8 on the other hand. Of course the part played by the members 2, 3 and 8 may be inverted by using a member 8 of permeable metal and magnets to constitute the pins 2 and 3.

The present invention is also concerned with any novel industrial products or articles embodying the device described hereinabove or based on the same principle.

Of course, the invention is not limited to the forms of embodiment shown and described herein which are given solely by way of example.

What I claim is:

A clockwork or like precision mechanism containing a continuously rotatable member, an electro-magnetic device for damping gross irregularities of rotation of said rotatable member in order to prevent an untimely rotation or galloping thereof and an oscillating element having a stable frequency comprising a relatively long resilient member securely held at one end, impact means on the other free end of said resilient member and two circumferentially arranged series of protruding stud means in staggered relationship on said rotatable member to exert impulses directly on said impact means for creating a reaction between said oscillating element and said rotatable member to ensure a positive and precise regulation of said member.

References Cited in the file of this patent

UNITED STATES PATENTS

| 2,373,429 | Straumann | Apr. 10, 1945 |
| 2,376,461 | Straumann | May 22, 1945 |
| 2,554,523 | Clifford | May 29, 1951 |

FOREIGN PATENTS

| 613,236 | Great Britain | Nov. 24, 1948 |